US008933996B2

(12) United States Patent
Hashimoto (10) Patent No.: US 8,933,996 B2
(45) Date of Patent: Jan. 13, 2015

(54) MULTIPLE VIEWPOINT IMAGING CONTROL DEVICE, MULTIPLE VIEWPOINT IMAGING CONTROL METHOD AND COMPUTER READABLE MEDIUM (75) Inventor: Takashi Hashimoto, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 619 days.

(21) Appl. No.: 13/203,829

(22) PCT Filed: Apr. 13, 2011

(86) PCT No.: PCT/JP2011/059195
§ 371 (c)(1),
(2), (4) Date: Aug. 29, 2011

(87) PCT Pub. No.: WO2012/002021
PCT Pub. Date: Jan. 5, 2012

(65) Prior Publication Data
US 2012/0002019 A1 Jan. 5, 2012

(30) Foreign Application Priority Data
Jun. 30, 2010 (JP) ................................. 2010-149681

(51) Int. Cl.
H04N 13/02 (2006.01)
H04N 13/00 (2006.01)

(52) U.S. Cl.
CPC ....... H04N 13/0221 (2013.01); H04N 13/0278 (2013.01); H04N 13/0282 (2013.01); H04N 13/021 (2013.01); H04N 13/0207 (2013.01); H04N 13/0296 (2013.01);
(Continued)

(58) Field of Classification Search
None
See application file for complete search history.

(56) References Cited

U.S. PATENT DOCUMENTS 6,781,619 B1   8/2004  Shirakura
2003/0052876 A1*  3/2003  Lee et al. ..................... 345/419
(Continued)

FOREIGN PATENT DOCUMENTS

JP   11-164325 A   6/1999
JP   11-341522 A   12/1999
(Continued)

OTHER PUBLICATIONS

L. Lipton, Foundations of the Stereoscopic Camera, ch. 3 (1982).*

Primary Examiner — Dave Czekaj
Assistant Examiner — David N. Werner
(74) Attorney, Agent, or Firm — McGinn IP Law Group, PLLC (57) ABSTRACT When images from multiple viewpoints are required, respective imaging locations of the multiple viewpoints are specified and imaging operations themselves may be executed simply. When image data is to be imaged from plural viewpoints that are elements for generating a three-dimensional form of a specific subject, a user is appropriately guided. Messages prompting ranging directly in front of the specific subject, movement from the ranging position to an imaging start point, and movement from the imaging start point to an imaging end point are displayed in a message display region of an LCD monitor or the like. In addition, from analysis of a through-image, positions of a digital camera are automatically identified and automatic imaging is carried out on the basis of movements of feature points.

16 Claims, 8 Drawing Sheets (52) U.S. Cl.
CPC ............... *H04N 13/02* (2013.01); *H04N 13/00* (2013.01); *H04N 13/0003* (2013.01); *H04N 13/0007* (2013.01); *H04N 13/0014* (2013.01)
USPC .................... 348/50; 348/42; 348/43; 348/46

(56) References Cited

U.S. PATENT DOCUMENTS

| | | | |
|---|---|---|---|
| 2003/0151659 A1 | 8/2003 | Kawano et al. | |
| 2003/0152263 A1 | 8/2003 | Kawano et al. | |
| 2004/0046855 A1* | 3/2004 | Saito | 347/138 |
| 2007/0247522 A1* | 10/2007 | Holliman | 348/46 |
| 2007/0296721 A1* | 12/2007 | Chang et al. | 345/427 |
| 2009/0066786 A1* | 3/2009 | Landa | 348/54 |
| 2009/0079762 A1* | 3/2009 | Fukushima et al. | 345/621 |
| 2009/0135244 A1* | 5/2009 | Kim et al. | 348/36 |
| 2009/0268014 A1* | 10/2009 | Holliman | 348/46 |
| 2011/0193941 A1* | 8/2011 | Inaba et al. | 348/46 |

FOREIGN PATENT DOCUMENTS

| | | |
|---|---|---|
| JP | 2000-66568 A | 3/2000 |
| JP | 2003-244500 A | 8/2003 |
| JP | 2003-244727 A | 8/2003 |
| JP | 2004-236156 A | 8/2004 |
| JP | 2008-154027 A | 7/2008 |
| JP | 2010-219825 A | 9/2010 |

\* cited by examiner

MULTIPLE VIEWPOINT IMAGING CONTROL DEVICE, MULTIPLE VIEWPOINT IMAGING CONTROL METHOD AND COMPUTER READABLE MEDIUM

TECHNICAL FIELD

The present invention relates to a multiple viewpoint imaging control device, multiple viewpoint imaging control method and computer readable medium storing a multiple viewpoint imaging control program for, by imaging a specific subject from plural viewpoints using a single lens, acquiring element data representing a three-dimensional form of the specific subject.

BACKGROUND ART

Heretofore, a three-dimensional image imaging assistance device has been known that creates a three-dimensional image using a platform and a rail (see Japanese Patent Application Laid-Open (JP-A) No. 2004-236156). With this three-dimensional image imaging assistance device, stable imaging is enabled by moving the platform symmetrically to left and right from a mid-point of the rail.

To obtain a three-dimensional image or an image for a stereoscopic display or the like, in essence, imaging of the image from multiple viewpoints is required. In the technology recited in JP-A No. 2004-236156, a special device is required for imaging.

Meanwhile, an imaging method for carrying out panoramic imaging has been proposed (see JP-A No. 11-164325), which is a technology in which a user performs imaging while holding and moving an imaging device manually.

JP-A No. 11-164325 recites, in respect of a problem with imaging not being carried out correctly if imaging equipment is not turned at a constant angular speed during panoramic imaging, calculating swing speeds on the basis of magnitudes of optical flow of pixels on a center line of the image, and synthesizing the panorama.

In JP-A No. 11-164325, it is recited that processing is necessary in which, in creation of a panoramic still image, two neighboring images do not strictly match and the user themself finds and identifies feature points by manual operation.

SUMMARY OF INVENTION

Technical Problem

However, with the technology of the above-mentioned JP-A No. 11-164325, the optical flow magnitudes are measured by reference to the center line at a central region (a subject region). Therefore, when imaging is centered on the subject, imaging may not be possible.

When imaging with multiple viewpoints is carried out in this manner, specification of imaging locations is difficult, and even when the imaging locations are specified, imaging operations from accurate viewpoints are complicated.

In consideration of the situation described above, an object of the present invention is to provide a multiple viewpoint imaging control device, multiple viewpoint imaging control method and a computer readable medium storing a multiple viewpoint imaging control program with which, when imaging from multiple viewpoints is required, specification of respective imaging locations of the multiple viewpoints may be performed simply and an imaging operation itself may be executed easily.

Solution to Problem

An invention relating to a first aspect of the present invention includes: an imaging section that images an image; a moving image display section that displays on a display screen a moving image for determining an imaging image angle; a ranging section that performs provisional imaging of a specific subject included in the moving image displayed at the moving image display section, and that measures at least a distance to the specific subject; an acquisition section that, when imaging is to be performed from a plurality of imaging viewpoints, acquires a convergence angle between the imaging viewpoints; a viewpoint number setting section that sets a number of viewpoints, including at least an imaging start point at which imaging is initially performed and an imaging end point at which imaging is finally performed; a position information computation section that computes position information including a movement amount from the imaging start point at which imaging is initially performed to the imaging end point at which imaging is finally performed, on the basis of data of the convergence angle and data of the distance from the ranging point to the specific subject measured by the ranging section, such that a viewpoint at the position of provisional imaging is at the middle of the movement amount; and a notification section that, on the basis of the position information computed by the position information computation section, executes a notification prompting movement from the ranging point to the imaging start point and a notification prompting movement from the imaging start point to the imaging end point.

An invention relating to a second aspect of the present invention is the invention relating to the first aspect, further including: a judgment section that, in accordance with the movement, uses the imaging start point as a reference image and judges whether or not the device is at a viewpoint that should be imaged, on the basis of a comparison between the reference image and an image imaged after movement; an automatic imaging execution control section that, when it is judged by the judgment section that the device is at an imaging point, automatically images the subject at that imaging point; and a storage section that stores image data imaged by the automatic imaging execution control section as the element data.

An invention relating to a third aspect of the present invention is the invention relating to the second aspect, in which updating is performed to set a viewpoint image that is automatically imaged by the automatic imaging execution control section at an imaging point subsequent to the imaging start point as a new reference image.

An invention relating to a fourth aspect of the present invention is the invention relating to the second or third aspect, in which the invention relating to the fourth aspect of the present invention is the invention relating to the second or third aspect, in which the judgment section judges, with respect to an image imaged after movement, whether or not the imaging viewpoint is a viewpoint that should be imaged on the basis of an offset amount of a pre-specified background image when a positional offset of the specific subject between the image imaged after the movement and the reference image has been corrected.

An invention relating to a fifth aspect of the present invention is the invention relating to any one of the first to fourth aspects, in which an image imaged at an imaging point prior to the imaging end point is displayed on the display screen with a predetermined degree of transparency.

An invention relating to a sixth aspect of the present invention is the invention relating to any one of the first to fifth aspects, in which a movement path from the imaging start point to the imaging end point is a circular arc path centered on the subject, and the ranging point is disposed at the middle of the movement range.

An invention relating to a seventh aspect of the present invention is the invention relating to any one of the first to sixth aspects, in which the imaging points, including the at least two imaging points at the imaging start point and the imaging end point, are at least one of automatically and manually set.

An invention relating to an eighth aspect of the present invention is the invention relating to any one of the first to seventh aspects, further including: a measurement section that measures a movement speed from the imaging start point to the imaging end point; and a stopping section that, if the movement speed measured by the measurement section is greater than a predetermined value, judges that continuing automatic imaging is not possible and stops the imaging by the automatic imaging execution control section.

An invention relating to a ninth aspect of the present invention includes: displaying a moving image for determining an imaging image angle on a display screen; provisionally imaging a specific subject that is included in the displayed moving image; measuring at least a distance to the specific subject; when imaging is to be performed from a plurality of imaging viewpoints, acquiring the imaging viewpoints and a convergence angle between the imaging viewpoints setting a number of viewpoints, including at least an imaging start point at which imaging is initially performed and an imaging end point at which imaging is finally performed; computing position information including a movement amount from the imaging start point at which imaging is initially performed to the imaging end point at which imaging is finally performed, on the basis of data of the convergence angle and data of the distance from the ranging point to the specific subject measured by the ranging section, such that a viewpoint at the position of provisional imaging is at the middle of the movement amount; and, on the basis of the computed position information, executing a notification prompting movement from the ranging point to the imaging start point and a notification prompting movement from the imaging start point to the imaging end point.

An invention relating to a tenth aspect of the present invention causes a computer to execute a process including: displaying a moving image for determining an imaging image angle on a display screen; provisionally imaging a specific subject that is included in the displayed moving image; measuring at least a distance to the specific subject; when imaging is to be performed from a plurality of imaging viewpoints, acquiring the imaging viewpoints and a convergence angle between the imaging viewpoints setting a number of viewpoints, including at least an imaging start point at which imaging is initially performed and an imaging end point at which imaging is finally performed; computing position information including a movement amount from the imaging start point at which imaging is initially performed to the imaging end point at which imaging is finally performed, on the basis of data of the convergence angle and data of the distance from the ranging point to the specific subject measured by the ranging section, that a viewpoint at the position of provisional imaging is at the middle of the movement amount; and, on the basis of the computed position information, executing a notification prompting movement from the ranging point to the imaging start point and a notification prompting movement from the imaging start point to the imaging end point.

According to the present invention, during a state in which a moving image is displayed at the display screen by the moving image display section, that is, in an imaging mode, the specific subject is kept within an image angle and a distance to the specific subject is measured by provisional imaging.

On the basis of the convergence angle data required for representing the three-dimensional form and the measured distance data, position data of the imaging start point that is initially imaged and the imaging end point that is finally imaged is computed. Here, the viewpoint of the provisional imaging position is at the middle.

Thereafter, first a message prompting movement from the measurement point to the imaging start point is given, and then a message prompting movement from the imaging start point to the imaging end point is given. These messages may be, for example, message displays on the display screen, and may be messages given aurally or the like. Alternatively, a separate display unit may be provided.

Judgment of whether the device is at an imaging position is a judgment of whether or not an imaging viewpoint corresponding to an imaged image after some movement is a viewpoint that should be imaged, on the basis of, for example, an offset amount of a pre-specified background image in the imaged image after the movement, after correction of a positional offset of the specific subject.

Thus, in the present invention, a user is simply prompted to move and then imaging is automatically executed when imaging points are reached in accordance with the movement. Therefore, element data (image data) for representing a three-dimensional form may be acquired easily. Moreover, special equipment or the like is not required for this imaging, and locations of subjects of photographing are not restricted.

With the present invention, the user moves from the measurement point to the imaging start point and then moves to the imaging end point in response to the message details. In accordance with this movement, he imaging start point serves as a reference image, a viewpoint that should be imaged is judged on the basis of comparisons between this reference image and imaged images after movements, and the subject is automatically imaged from points at which imaging should be carried out. The imaged image data is stored as element data for representing the three-dimensional form.

If a movement path from the imaging start point to the imaging end point is a circular arc centered on the subject, focusing distances to the subject and positions in the image angle may be continuously constant. Furthermore, because the provisional imaging position is disposed at the middle of the movement range, a through-image expressing a three-dimensional form with left-right symmetry about the subject may be acquired.

If the imaging device is not pointed at the specific subject, then, for example, the specific subject may be at a different position from the position at the time of provisional imaging. In this case, it is sufficient to correct the difference between the reference image and the imaged image after the movement on the basis of a movement amount of a pre-specified background image.

An image whose imaging has been finished is kept displayed at the display screen as a "semi-transparency". Thus, setting the imaging angle in accordance with the moving image at a next imaging point is easier.

As imaging points, it is sufficient to include at least two locations, the imaging start point and the imaging end point.

A number of imaging points may be automatically set in accordance with a distance to the subject. The number of imaging points may also be manually set by a user.

When the movement speed from the imaging start point to the imaging end point is measured and this movement speed is above a predetermined value, it is judged that automatic imaging continuation is not possible and imaging is stopped by the automatic imaging execution control section. This is because, if the movement is too fast, the imaging points may be shifted and convergence angles may be confused.

After automatic imaging is stopped thus, an instruction may be given to re-do the imaging from the beginning, or an instruction may be given to resume the imaging from the next imaging point after an imaging point up to which excellent imaging has already been completed.

Advantageous Effects of Invention

According to the present invention as described above, advantageous effects may be provided in that, when imaging from multiple viewpoints is required, specification of the respective locations of the multiple viewpoints may be performed simply and an imaging operation itself may be executed easily.

DESCRIPTION OF EMBODIMENTS

-First Exemplary Embodiment-

Figure 1:
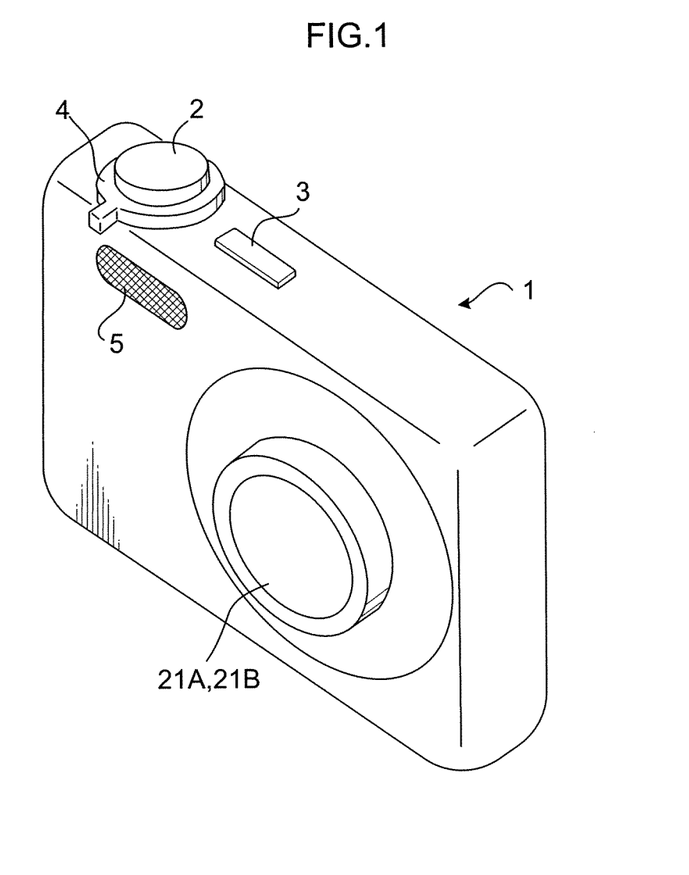
FIG. 1 shows a front face side perspective view of a compound digital camera of a first exemplary embodiment.
Figure 2:
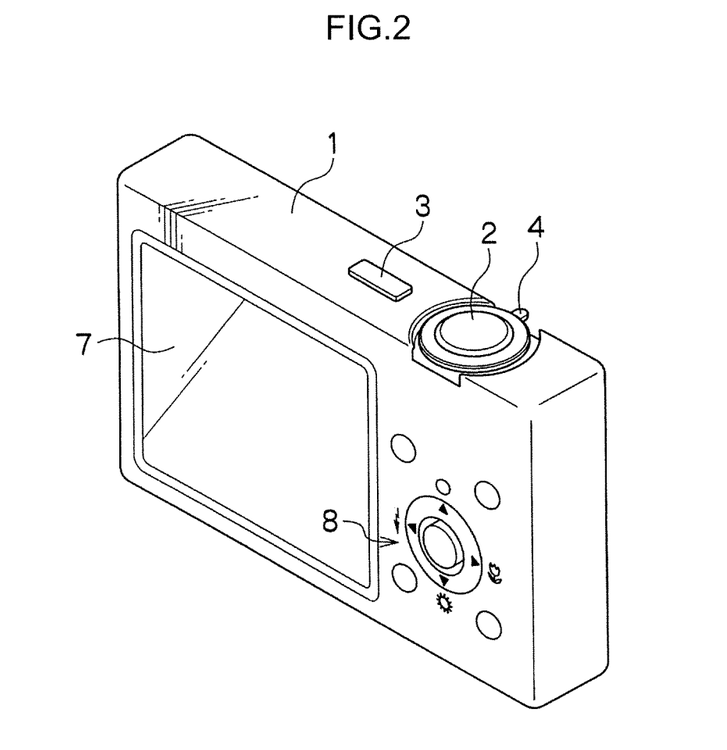
FIG. 2 shows a rear face side perspective view of the compound digital camera of the first exemplary embodiment.

As illustrated in FIG. 1 and FIG. 2, a shutter release button 2, a power supply button 3 and a zoom lever 4 are provided at a top portion of a digital camera 1. A flash 5 and lenses for two imaging portions 21A and 21B are disposed at a front face of the digital camera 1, which is a compound digital camera. An LCD monitor 7 that performs various kinds of display and various operation buttons 8 are disposed at a rear face of the compound digital camera 1.

Figure 3:
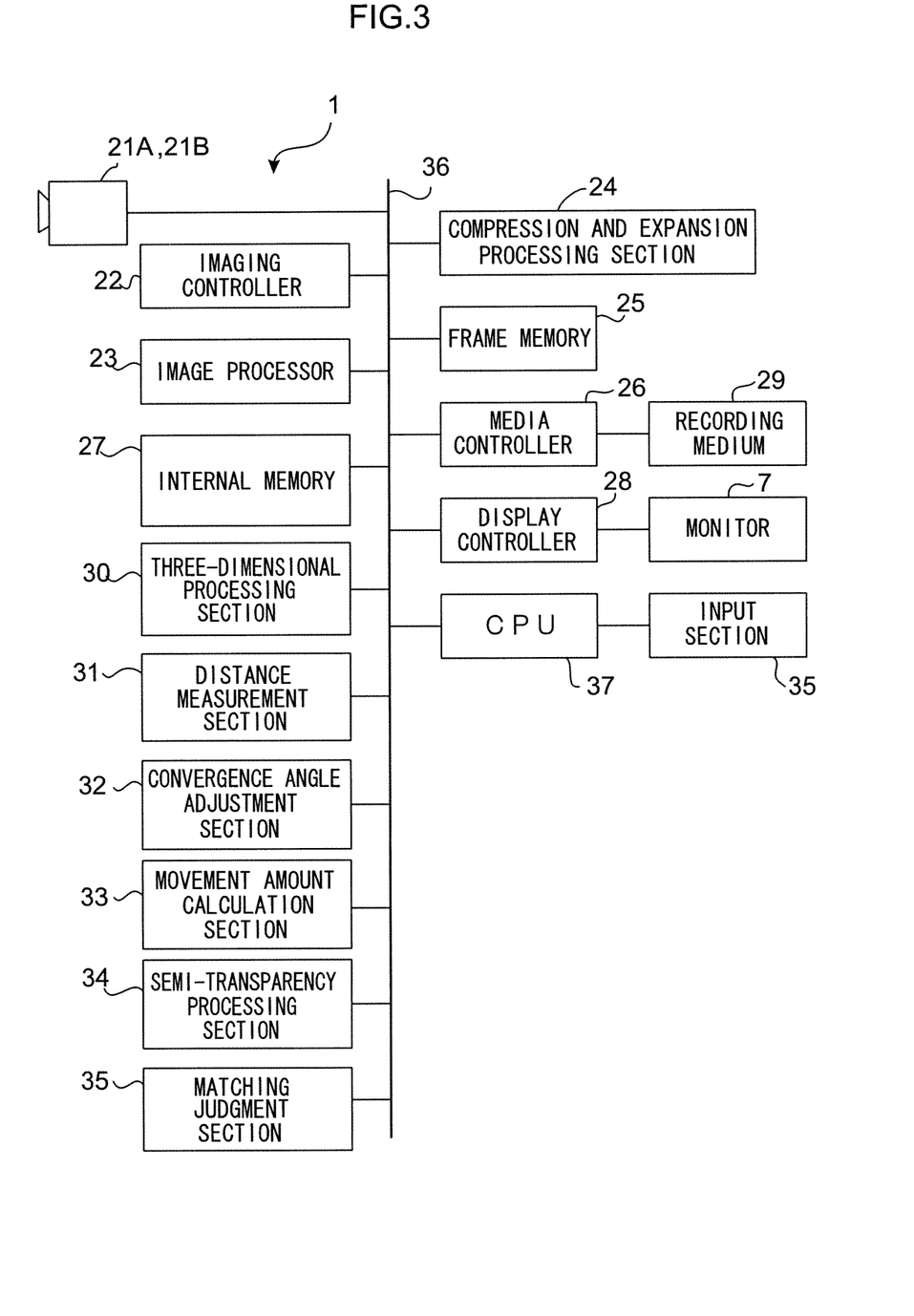
FIG. 3 shows a schematic block diagram illustrating internal structure of the compound digital camera of the first exemplary embodiment.

FIG. 3 shows a schematic block diagram illustrating internal structure of the digital camera 1. As illustrated in FIG. 3, the digital camera 1 is equipped with the two imaging portions 21A and 21B, an imaging controller 22, an imaging processor 23, a compression and expansion processing section 24, a frame memory 25, a media controller 26, an internal memory 27, a display controller 28, an input section 36 and a CPU 37.

The imaging controller 22 is constituted with an unillustrated autofocus processing section and autoexposure processing section. The autofocus processing section determines a focusing region on the basis of a preliminary image acquired by the imaging portion 21A when the shutter release button 2 is operated by half-pressing, determines a lens focus position, and outputs the same to the imaging portion 21A. The autofocus processing section both uses a subject region as a focusing region to determine the lens focus position and, for processing which is described below, uses a background region separate from the subject region as a focusing region to determine the lens focus position. Herein, the subject region and the background region are identified by image recognition processing previously known in related art. The autoexposure processing section determines an aperture value and a shutter speed on the basis of the preliminary image and outputs the same to the imaging portion 21A.

The imaging controller 22 also measures a distance to the subject (ranging) in response to the half-press operation of the shutter release button 2, and instructs actual imaging in response to a full-press operation. Until the shutter release button 2 is operated, the imaging controller 22 maintains continuous acquisition by the imaging portion 21A of a moving image (imaged images with a smaller number of pixels than in actual imaging and with a predetermined time interval (for example, an interval of 1/30 s)) that is for determining an imaging image angle in an imaging mode. Herebelow, this moving image may be referred to as a through-image.

The imaging processor 23 applies image processing, such as processing for adjusting white balance, gradation processing, sharpness processing, color correction and the like, to digital image data of images acquired by the imaging portion 21A.

The compression and expansion processing section 24 performs compression processing in a compression format such as, for example, JPEG or the like on image data representing an image to which processing has been applied by the imaging processor 23, and creates an image file. This image file contains image data and, based on the Exif format or the like, stores supplementary information such as an imaging date and time and the like, and viewpoint information representing viewpoint positions in a three-dimensional form imaging mode, which is described below.

The frame memory 25 is a working memory that is used when various kinds of processing are being carried out on image data representing an image acquired by the imaging portion 21A. including the processing that is performed by the imaging processor 23.

The media controller 26 controls access to a recording medium 29 and reading and writing of image files and the like.

The internal memory 27 memorizes various constants set at the digital camera 1, programs that the CPU 37 executes, and the like.

The display controller 28 causes images stored in the frame memory 25 during imaging to be displayed at the LCD monitor 7, and images recorded in the recording medium 29 to be displayed at the LCD monitor 7. The display controller 28 also causes the through-image to be displayed at he LCD monitor 7.

The digital camera 1 is further equipped with a three-dimensional processing section 30, a distance measurement section 31, a convergence angle adjustment section 32, a movement amount calculation section 33, a semi-transparency processing section 34 and a matching judgment section 35.

The three-dimensional processing section 30 applies three-dimensional processing to plural images imaged from plural viewpoints to generate a stereoscopic image.

The distance measurement section 31 measures the distance to a subject on the basis of a lens focus position of the subject region obtained by the autofocus processing section of the imaging controller 22, and measures the distance to a background on the basis of a lens focus position of the background region.

The convergence angle adjustment section 32 calculates angles between the plural images to be imaged in the three-dimensional form imaging mode. When a stereoscopic image is to be created by the three-dimensional processing section 31, on the basis of the calculated convergence angle(s), the convergence angle adjustment section 32 performs convergence angle adjustment processing to superpose the plural images such that positions thereof match up.

On the basis of the distance to the subject measured by the distance measurement section 31, the movement amount calculation section 33 calculates an optimum movement distance (movement range) between the plural views when imaging in the three-dimensional form imaging mode.

The semi-transparency processing section 34 applies semi-transparency processing to an imaged image (in this case, an image imaged at an initial imaging point (an imaging start point)) when imaging from plural viewpoints.

The matching judgment section 35 performs differentiation (for example, Laplacian processing) on the images imaged at the viewpoints and the through-image, calculates a coefficient of correlation between a subject region in the differentiated image and a subject region in the through-image, and calculates a coefficient of correlation between a feature point in the image and a feature point in the through-image.

When the calculated coefficient of correlation of the subject region is at least a first threshold value, the matching judgment section 35 instructs the imaging controller 22 to image an image. Accordingly, the imaging controller 22 automatically executes imaging with the imaging portion 21A.

In this first exemplary embodiment, a mode is provided (the three-dimensional form imaging mode) that uses the digital camera 1 that has a single lens to acquire elements of a three-dimensional form with a specific subject 50 as a target, and acquires image data imaged from plural viewpoints.

The positions of the viewpoints may be specified in a state in which the digital camera 1 is pointing directly at a front of the specific subject 50, on the basis of the distance to the subject (which is ranged by the distance measurement section 31).

For this ranging, range data may be extracted at a time of actual imaging (provisional imaging), or ranging data produced by a half-press of the shutter release button 2 may be used.

The CPU 37 controls the convergence angle adjustment section 32 and the movement amount calculation section 33, and obtains an imaging range of the specific subject 50 on the basis of the measured range data. The imaging range is an imaging range that spreads in a fan shape (to the angle θ shown in FIG. 4A and FIG. 4B) centered on the front of the specific subject 50 (the current position of the digital camera 1). Accordingly, a circular arc path centered on the specific subject 50 is formed.

In the three-dimensional form imaging mode, it is necessary to specify at least one viewpoint at each of left and right (at least two points) on a straight line (chord) 54 joining two ends of the circular arc path centered on the specific subject 50 (an imaginary line 52 in FIG. 4A and FIG. 4B), so as to sandwich a front face image of the specific subject 50.

Although it is preferable to specify viewpoints on the circular arc path imaginary line 52, in consideration of movement being entrusted to the user, the straight line 54 is specified, it being assumed that the circular arc path imaginary line 52 and the straight line 54 are similar.

In the first exemplary embodiment, the two ends of the straight line 54 are specified as viewpoints; one end serves as an imaging start point S and the other end serves as an imaging end point E. There may be more imaging points (viewpoints) on the straight line 54. In this case, the angle θ does not necessarily match the convergence angle. If there are two viewpoints—the imaging start point S and the imaging end point E—the angle θ is the convergence angle.

Figure 5:
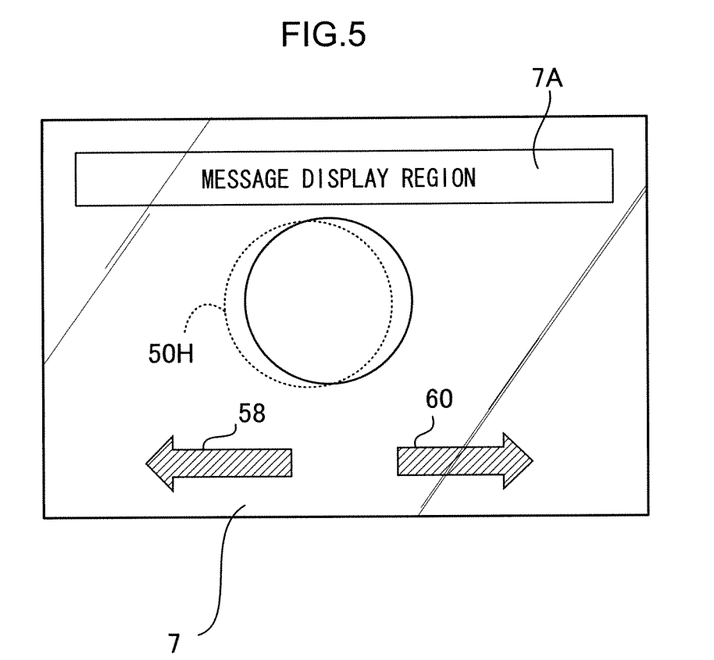
FIG. 5 shows an elevational diagram of an LCD monitor in which a message display region is provided, relating to the first exemplary embodiment.

Now, in the first exemplary embodiment, when the viewpoints are determined, a message that prompts ranging directly in front of the specific subject 50 is displayed in a message display region 7A of the LCD monitor 7, as illustrated in FIG. 5.

With the front of the specific subject 50 (that is, a position of ranging by provisional imaging or the like) serving as a reference, a message prompting the user to move to the imaging start point S is displayed at the message display region 7A of the LCD monitor 7. Then an arrow image 58 (to the left in this case) guiding a direction of movement is displayed at the LCD monitor 7 and guides the user in the direction of movement.

Whether or not the user guided by the message displayed in the message display region 7A and/or the arrow image 58 has reached the imaging start point S may be automatically determined by analysis of changes of position of a feature point 56 in the through-image as mentioned above. Hence, when the user reaches the imaging start point S, imaging is automatically started.

When imaging is completed at the imaging start point S, a message prompting the user to move to the imaging end point E is displayed at the message display region 7A of the LCD monitor 7, and an arrow image 60 (to the right in this case) guiding a direction of movement is displayed. Hence, the user moves along the straight line 54 in FIG. 4A and FIG. 4B while holding the digital camera 1.

Figure 4A:
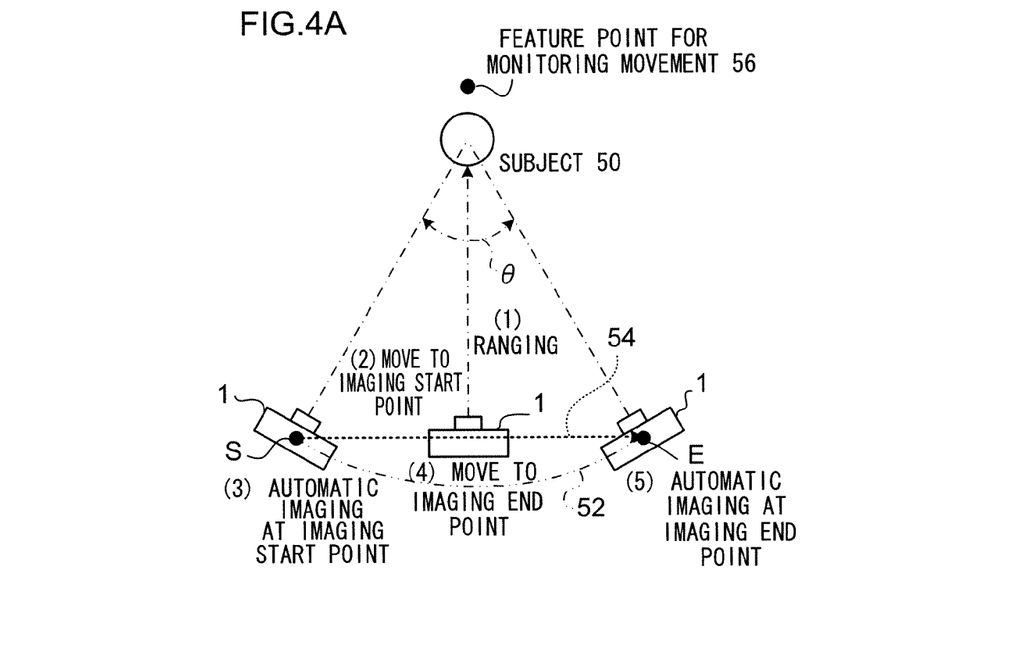
FIG. 4A is a conceptual diagram relating to the first exemplary embodiment illustrating an ideal state in which, when imaging viewpoints and a movement path and movement amount for causing a user to move are set, the digital camera faces a specific subject.
Figure 4B:
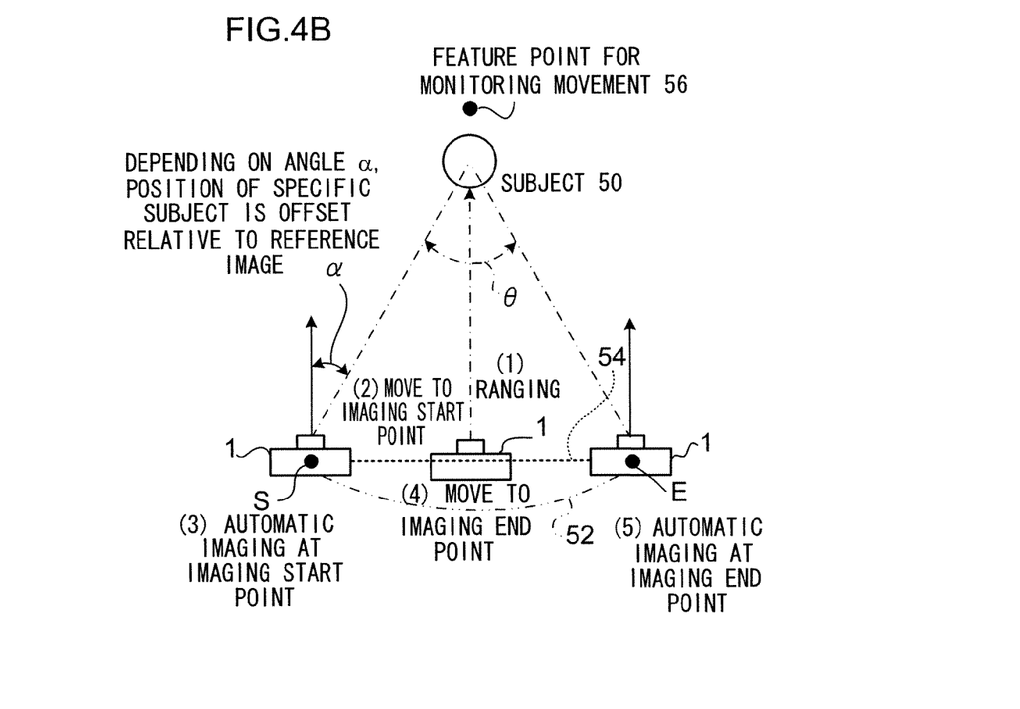
FIG. 4B is a conceptual diagram relating to the first exemplary embodiment illustrating a state in which, when imaging viewpoints and a movement path and movement amount for causing a user to move are set, the digital camera does not face the specific subject.

FIG. 4A illustrates a state in which the digital camera 1 performs imaging in ideal orientations pointing at (facing) the specific subject 50. In contrast, FIG. 4B illustrates a state in which the digital camera 1 does not face the specific subject 50 (the optical axis is misaligned).

In this first exemplary embodiment, the image imaged at the imaging start point S is displayed at the LCD monitor 7 in the form of a semi-transparent image 50H. This semi-transparent image 50H may function as a measure of movement of the user along the straight line 54.

If viewpoints are specified on the straight line 54, imaging is automatically executed at the times thereof. When the user reaches the imaging end point E, a final automatic imaging is executed.

Image data of the plural viewpoints at which imaging has been performed (at least the imaging start point S and the imaging end point E) is related as elements for generating a three-dimensional form of the specific subject 50, and is memorized in the frame memory 25 or the like. The image data may be memorized to the recording medium 29.

Herebelow, operation of the first exemplary embodiment is described.

Figure 6:
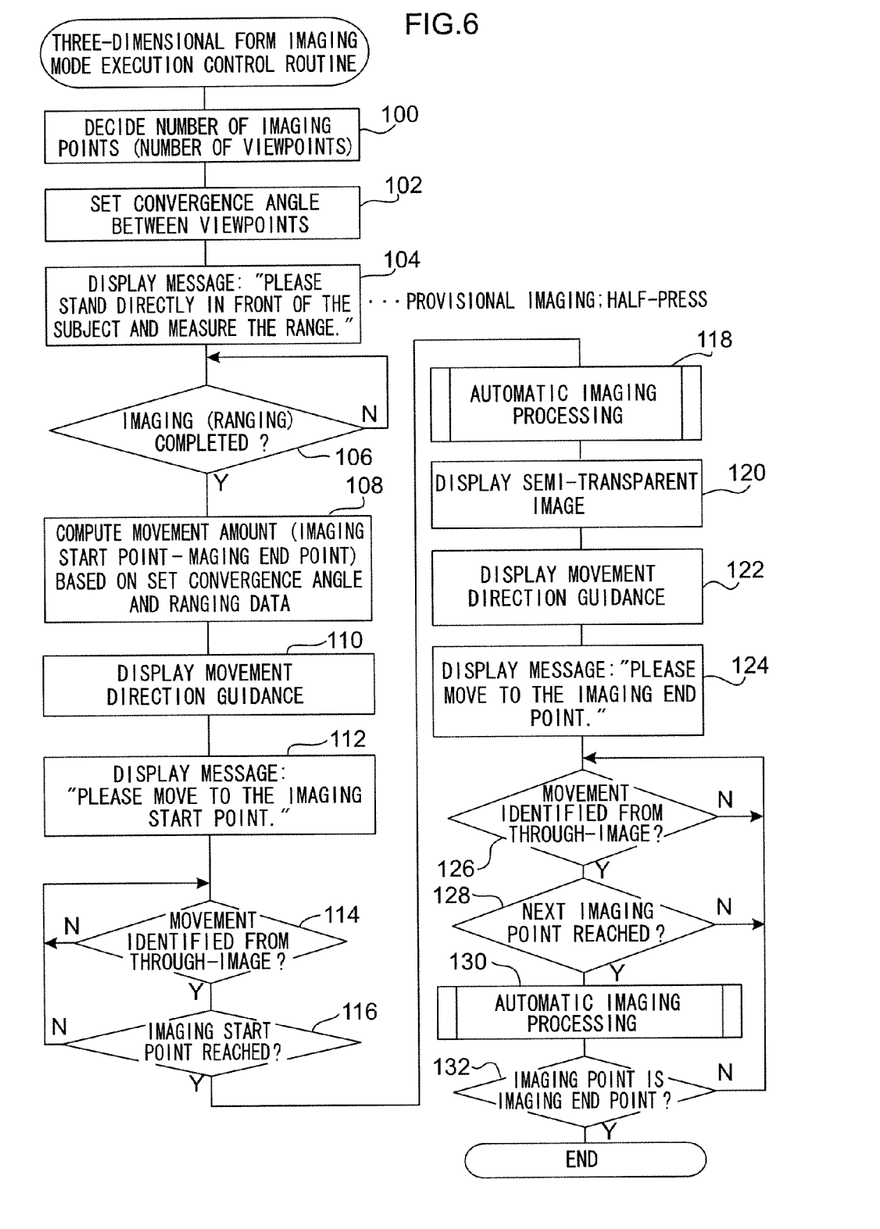
FIG. 6 shows a flowchart illustrating a three-dimensional form imaging mode execution control routine relating to the first exemplary embodiment.

FIG. 6 is a flowchart illustrating a three-dimensional form imaging mode execution control routine of the first exemplary embodiment.

In step 100, a number of imaging points (the number of viewpoints) is decided. The number of viewpoints may be a number set beforehand, and may be a number arbitrarily set by a user. The viewpoints must include the imaging start point S and the imaging end point E.

Then, in step 102, a convergence angle between the specified viewpoints is determined. Then the routine proceeds to step 104 and displays a message ("Please stand directly in front of the subject and measure the range.") at the message display region 7A of the LCD monitor 7 (see FIG. 5). This message might be "Please take a provisional image.", "Half-press the shutter button to measure the range." or the like.

Then, in step 106, it is judged whether or not imaging (provisional imaging) or ranging has ended (whether range data has been acquired). When this judgment is affirmative, the routine proceeds to step 108 and, on the basis of the specified convergence angle and the ranging data, a movement amount of the digital camera (from the imaging start point S to the imaging end point E) is computed, and the routine proceeds to step 110.

In step 110, movement direction guidance (the arrow image 58) is displayed at the LCD monitor 7. Then the routine proceeds to step 112, a message ("Please move to the imaging start point.") is displayed at the message display region 7A of the LCD monitor 7, and the routine proceeds to step 114.

In step 114, it is judged whether or not movement has been identified from the through-image. If this judgment is negative, it is judged that the user has not moved. If the judgment in step 114 is affirmative, it is judged that the user has moved and the routine proceeds to step 116. In step 116, it is judged whether or not the movement has reached the imaging start point S. If this judgment is negative, the routine returns to step 114 and the judgments of steps 114 and 116 are repeated.

When the judgment in step 116 is affirmative, it is judged that the user (which is to say the digital camera 1) has reached the imaging start point S, the routine proceeds to step 118, and automatic image processing is executed. In this automatic imaging processing, exposure, focusing distance, shutter speed, imaging, data storage and the like are automatically processed.

Then, in step 120, the semi-transparent image 50H is displayed on the LCD monitor 7 on the basis of the image data imaged at the imaging start point S, and the routine proceeds to step 122. The display of this semi-transparent image 50H may serve as a measure when the user moves. The semi-transparent image 50H may, at the same time as being a visual measure, function as a reference image for correcting mispositioning of the specific subject 50 within the image angle. This reference image may constantly employ the image imaged at the imaging start point as the provisional image, or may be updated at intervals of imaging being performed at the respective viewpoints.

In step 122, movement direction guidance (the arrow image 60) is displayed at the LCD monitor 7. Then the routine proceeds to step 124, a message ("Please move to the imaging end point.") is displayed at the message display region 7A of the LCD monitor 7, and the routine proceeds to step 126.

In step 126, it is judged whether or not movement has been identified from the through-image. If this judgment is negative, it is judged that the user has not moved. If the judgment in step 126 is affirmative, it is judged that the user has moved and the routine proceeds to step 128. In step 128, it is judged whether or not the movement has reached the next imaging point. If this judgment is negative, the routine returns to step 126 and the judgments of steps 126 and 128 are repeated.

When the judgment in step 128 is affirmative, it is judged that the user (which is to say the digital camera 1) has reached the next imaging point, the routine proceeds to step 130, and automatic image processing is executed. In this automatic imaging processing, all of exposure, focusing distance, shutter speed, imaging, data storage, positional correction of the specific subject 50 and the like are automatically processed. In this case, a state in which an ideal orientation of the digital camera 1 is ideal in accordance with FIG. 4A is assumed. Positional correction of the specific subject 50 is described below on the basis of FIG. 4B.

Then, in step 132, it is judged whether or not this imaging point is the imaging end point E. If this judgment is negative, imaging is to continue and the routine returns to step 126. If the judgment in step 132 is affirmative, imaging is finished at the imaging end point E and it is judged that imaging at at least the imaging start point S and the imaging end point E, the two ends of the straight line 54 illustrated in FIG. 4A and FIG. 4B (the movement range), is completed and the routine ends.

In the first exemplary embodiment as described hereabove, when image data is to be imaged from plural viewpoints to serve as elements for generating a three-dimensional form of the specific subject 50, the user is appropriately guided. Thus, messages prompting ranging directly in front of the specific subject 50, movement from the ranging position to the imaging start point S and movement from the imaging start point S to the imaging end point E are displayed at the message display region 7A of the LCD monitor 7 or the like. Positions of the digital camera 1 are automatically recognized and automatically imaged on the basis of changes of the feature point 56 from analysis of the through-image. Therefore, images from a plural number of viewpoints may be correctly imaged without depending on complicated procedures by the user. Furthermore, no equipment or the like is necessary for guiding movement for the three-dimensional imaging.

In the first exemplary embodiment, the state in FIG. 4A, that is, with (the optical axis of) the digital camera 1 facing (pointed at) the specific subject 50 has been assumed. However, in practical conditions, the orientation of the digital camera 1 depends on the user. Consequently, as illustrated in FIG. 4B, the facing of the digital camera 1 may not face the specific subject 50 (see angle α in FIG. 4B).

In this case, when provisional imaging or imaging at the imaging start point S is performed, the specific subject 50 located at the middle of the image angle is offset from the middle of the image. This offset depends on the angle α in FIG. 4B.

Accordingly, a movement amount (offset amount) of the specific subject 50 is computed on the basis of positional correlations of the specific subject 50 and the pre-specified feature point 56, and correction is performed such that the specific subject 50 is in the middle of the image angle.

More specifically, for example, when the optical axis of the digital camera 1 is oriented straight upward in the drawing at the imaging start point S of FIG. 4B and the angle between the optical axis and the specific subject 50 is the angle α, the specific subject 50 is offset to the right side from the middle of the image angle. This offset to the right side is difficult to identify from the specific subject 50 alone. Therefore, the feature point 56 in the background of the specific subject 50 is specified, the offset amount is calculated on the basis of positional correlations of the specific subject 50 and the feature point 56, and the image is corrected such that the position of the specific subject 50 is brought to the middle of the image angle.

Thus, even when the orientation of the digital camera 1 that is dependent on the user is not the ideal (see FIG. 4A), image data may be obtained from plural viewpoints for generating the three-dimensional form.

If the specific subject 50 is greatly offset from the middle of the image angle, image data imaged before and after that imaging point may be synthesized.

-Second Exemplary Embodiment-

A second exemplary embodiment of the present invention is described herebelow. In the second exemplary embodiment, structural portions that are the same as in the first exemplary embodiment (including the illustrated flow) are assigned the same reference numerals, and descriptions of those structures are not given.

A characteristic of the second exemplary embodiment is that a movement speed at which the user moves along the straight line 54 of FIG. 4A and FIG. 4B is monitored. After automatic imaging at the imaging start position, basically, if the user moves at a speed faster than a speed that is set beforehand, appropriate imaging may not be possible during the movement, depending on the exposure, the shutter speed and the like. Accordingly, in the second exemplary embodiment, the movement speed is computed at the time at which imaging viewpoints are decided, and a movement speed indicator portion 62 is provided at the LCD monitor 7.

Figure 7A:
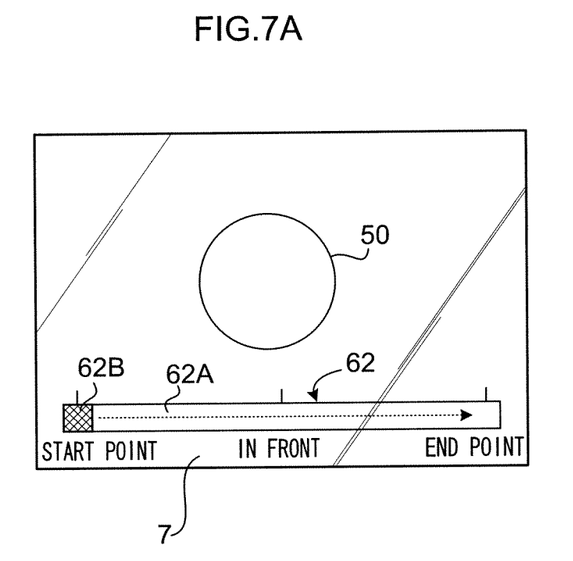
FIG. 7A shows an elevational diagram of an LCD monitor relating to a second exemplary embodiment, in which a movement speed indicator portion is provided, illustrating a time when an imaging start point S is indicated.
Figure 7B:
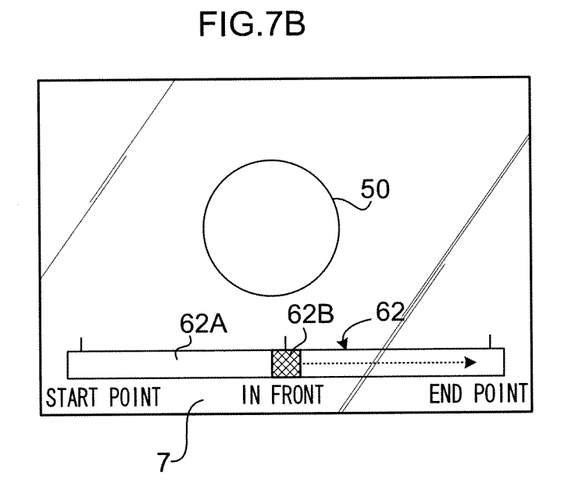
FIG. 7B shows an elevational diagram of the LCD monitor relating to the second exemplary embodiment, in which a movement speed indicator portion is provided, illustrating a time when a point directly in front of a specific subject is indicated.

The movement speed indicator portion 62 is constituted with a long horizontal display region 62A and an indicator portion 62B that moves along the display region 62A.

When the movement speed is computed at the time at which the viewpoints to be imaged are decided, the indicator portion 62B is displayed at the left end of the display region 62A in FIG. 7A, which is the imaging start point S.

When automatic imaging is executed at the imaging start point S, the indicator portion 62B moves from the left end to the imaging end point E at the right end in accordance with the computed movement speed. That is, movement of the indicator portion 62B functions as a measure for movement by the user. For example, when the indicator portion 62B reaches the middle of the display region 62A as illustrated in FIG. 7B, it is appropriate for the user to be directly in front of the specific subject 50 at that moment. When the user is prompted to move, the user moves while watching the indicator portion 62B, and may maintain an appropriate movement speed while moving.

Figure 8:
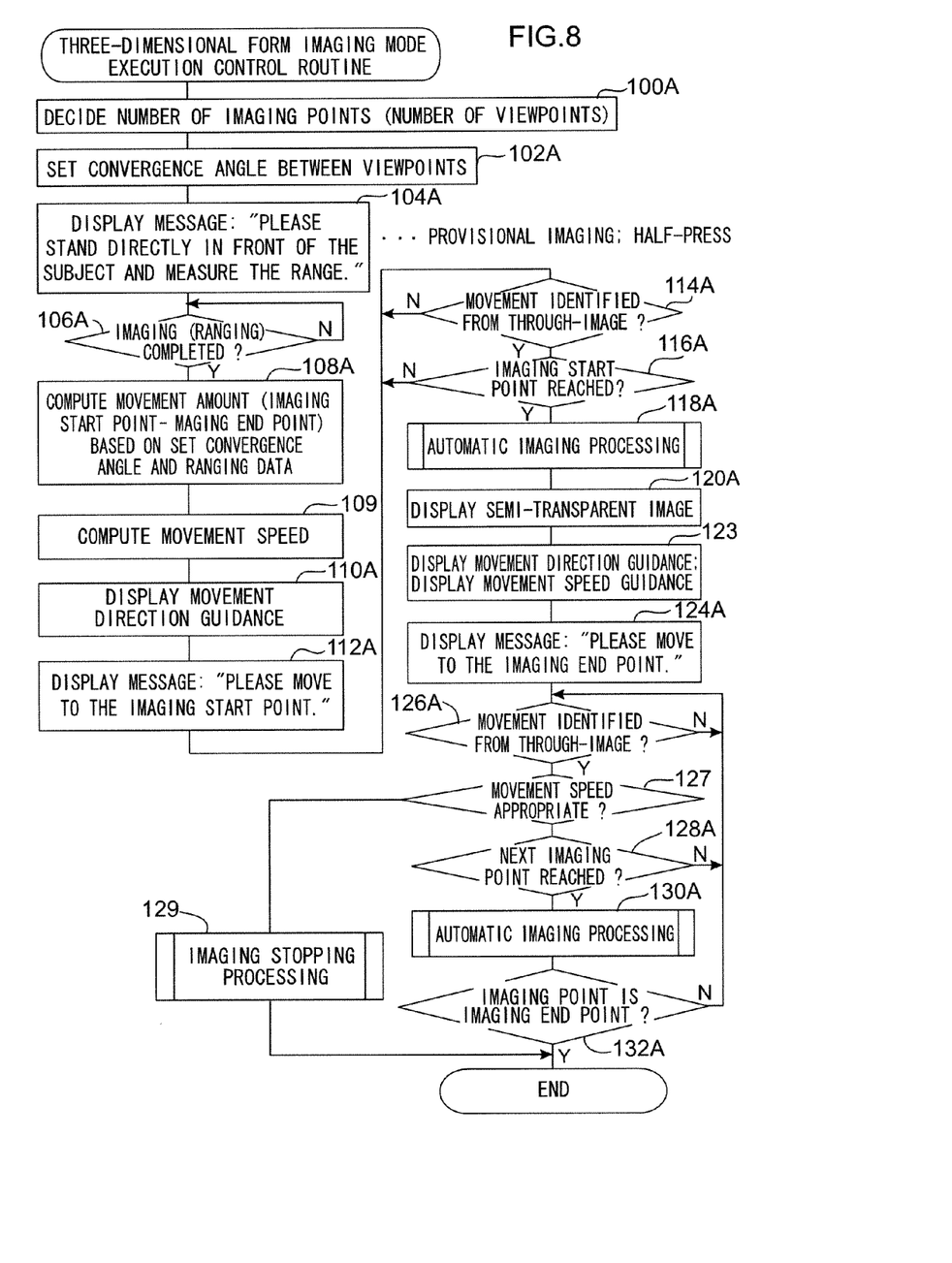
FIG. 8 shows a flowchart illustrating a three-dimensional form imaging mode execution control routine relating to the second exemplary embodiment.

Herebelow, operation of the second exemplary embodiment is described in association with the flowchart of FIG. 8. In the flowchart of FIG. 8, processing relating to movement speed is added to the flowchart of FIG. 6 of the first exemplary embodiment. Processing steps that perform processing the same as in FIG. 6 are described with the same reference numerals with an "A" appended.

In step 100A, the number of imaging points (number of viewpoints) is decided. The number of viewpoints may be a number set beforehand, and may be a number arbitrarily set by a user. The viewpoints must include the imaging start point S and the imaging end point E.

Then, in step 102A, a convergence angle between the specified viewpoints is determined. Then the routine proceeds to step 104A, and displays a message ("Please stand directly in front of the subject and measure the range.") at the message display region 7A of the LCD monitor 7. This message might be "Please take a provisional image.", "Half-press the shutter button to measure the range." or the like.

Then, in step 106A, it is judged whether or not imaging (provisional imaging) or ranging has ended (range data has been acquired). When this judgment is affirmative, the routine proceeds to step 108A and, on the basis of the specified convergence angle and the ranging data, a movement amount of the digital camera (from the imaging start point S to the imaging end point E) is computed, and the routine proceeds to step 109.

In step 109, a movement speed in the movement range through which the user is prompted to move (the straight line 54 in FIG. 4A and 4B) is computed. This computation of the movement speed depends on, for example, the exposure, shutter speed and the like during imaging, and movement of the specific subject 50 and the like. The movement speed computed in step 109 is reflected in the display of the movement speed indicator portion 62 described below. When the movement speed has been computed in step 109, the routine proceeds to step 110A.

In step 110A, movement direction guidance (the arrow image 58) is displayed at the LCD monitor 7. Then the routine proceeds to step 112A, a message ("Please move to the imaging start point.") is displayed at the message display region 7A of the LCD monitor 7, and the routine proceeds to step 114A.

In step 114A, it is judged whether or not movement has been identified from the through-image. If this judgment is negative, it is judged that the user has not moved. If the judgment in step 114A is affirmative, it is judged that the user has moved and the routine proceeds to step 116A. In step 116A, it is judged whether or not the movement has reached the imaging start point S. If this judgment is negative, the routine returns to step 114A and the judgments of steps 114A and 116A are repeated.

When the judgment in step 116A is affirmative, it is judged that the user (which is to say the digital camera 1) has reached the imaging start point S, the routine proceeds to step 118A, and automatic image processing is executed. In this automatic imaging processing, exposure, focusing distance, shutter speed, imaging, data storage and the like are automatically processed.

Then, in step 120A, the semi-transparent image 50H is displayed on the LCD monitor 7 on the basis of the image data imaged at the imaging start point S, and the routine proceeds to step 123. The display of this semi-transparent image 50H may serve as a measure when the user moves.

In step 123, movement direction guidance (the arrow image 60) is displayed at the LCD monitor 7 and, in accordance with the movement speed computed in step 109, the indicator portion 62B that functions as a measure of movement speed using the movement speed indicator portion 62 is displayed at the left end of the display region 62A (see FIG. 7A). Then the routine proceeds to step 124A, a message ("Please move to the imaging end point.") is displayed at the message display region 7A of the LCD monitor 7, and the routine proceeds to step 126A.

The indicator portion 62B of the movement speed indicator portion 62 moves along the display region 62A toward the right end when the user is moving along the straight line 54 from the imaging start point S to the imaging end point E. Hence, when the indicator portion 62B is disposed in the middle of the display region 62A as illustrated in FIG. 7B, the appropriate position for the user is to be directly in front of the specific subject 50. By moving along the straight line 54 while watching the movement state of the indicator portion 62B, the user may move along an appropriate movement path at an appropriate movement speed.

In step 126A, it is judged whether or not movement has been identified from the through-image. If this judgment is negative, it is judged that the user has not moved. If the judgment in step 126A is affirmative, it is judged that the user has moved and the routine proceeds to step 127. In step 127, the movement along the indicator portion 62B mentioned above is appropriate, and if it is established from analysis of the through-image that the user is at a position separated by more than a predetermined amount from the indicator portion 62B, a judgment of step 127 is negative and the routine proceeds to step 129. In step 129, processing is executed to forcibly stop imaging by the three-dimensional form imaging mode, and the routine ends. In this processing to stop the imaging, a message such as "Movement speed is not appropriate, so imaging is being stopped.", "Please restart from range measurement again." or the like may be displayed at the LCD monitor 7.

On the other hand, if the judgment of step 127 is affirmative, that is, if the movement speed is appropriate, the routine proceeds to step 128A. In step 128A, it is judged whether or not the movement has reached the next imaging point. If this judgment is negative, the routine returns to step 126A and the judgments of steps 126A, 127 and 128A are repeated.

When the judgment in step 128A is affirmative, it is judged that the user (which is to say the digital camera 1) has reached the next imaging point, the routine proceeds to step 130A, and automatic image processing is executed. In this automatic imaging processing, all of exposure, focusing distance, shutter speed, imaging, data storage, positional correction of the specific subject 50 (see FIG. 4B) and the like are automatically processed.

Then, in step 132A, it is judged whether or not this imaging point is the imaging end point E. If this judgment is negative, imaging is to continue and the routine returns to step 126A. If the judgment in step 132A is affirmative, imaging is finished at the imaging end point E and it is judged that imaging at at least the imaging start point S and the imaging end point E, the two ends of the straight line 54 illustrated in FIG. 4A and FIG. 4B (the movement range), is completed and the routine ends.

The execution processing routines of the three-dimensional form imaging mode of the first exemplary embodiment and second exemplary embodiment described above may take the form of a program.

The disclosures of Japanese Patent Application No. 2010-149681 are incorporated into the present specification by reference in their entirety.

All references, patent applications and technical standards recited in the present specification are incorporated by reference in the present specification to the same extent as if each reference, patent application and technical standard was specifically and individually described as being incorporated by reference herein.

The invention claimed is:

1. A multiple viewpoint imaging control device comprising:
an imaging section that images an image;
a moving image display section that displays on a display screen a moving image for determining an imaging image angle;
a ranging section that performs provisional imaging of a specific subject included in the moving image displayed at the moving image display section, and that measures at least a distance to the specific subject;
an acquisition section that, when imaging is to be performed from a plurality of imaging viewpoints, acquires a convergence angle between the imaging viewpoints;
a viewpoint number setting section that sets a number of viewpoints, including at least an imaging start point at which imaging is initially performed and an imaging end point at which imaging is finally performed;
a position information computation section that computes position information including a movement amount of a viewpoint from the imaging start point at which imaging is initially performed to the imaging end point at which imaging is finally performed, on a basis of data of the convergence angle and data of the distance from a ranging point to the specific subject measured by the ranging section, such that a viewpoint at a position of provisional imaging is at a middle of the movement amount;
a notification section that, on a basis of the position information computed by the position information computation section, executes a notification prompting that a viewpoint be moved from the ranging point to the imaging start point and a notification prompting that a viewpoint be moved from the imaging start point to the imaging end point;
an automatic imaging execution control section that automatically images the subject at an imaging viewpoint;
a judgment section that, in accordance with the movement of a viewpoint, uses the imaging start point as a reference image and judges whether or not the device is at a viewpoint that should be imaged, on a basis of a comparison between the reference image and an image imaged after movement, the automatic imaging execution control section automatically imaging the subject at an imaging viewpoint when it is judged by the judgment section that the device is at the imaging viewpoint; and
a storage section that stores image data imaged by the automatic imaging execution control section as an element data.

2. The multiple viewpoint imaging control device according to claim 1, wherein an updating is performed to set a viewpoint image that is automatically imaged by the automatic imaging execution control section at an imaging point subsequent to the imaging start point as a new reference image.

3. The multiple viewpoint imaging control device according to claim 1, wherein the judgment section judges, with respect to an image imaged after movement of a viewpoint, whether or not the imaging viewpoint is a viewpoint that should be imaged on a basis of an offset amount of a pre-specified background image when a positional offset of the specific subject between the image imaged after the movement and the reference image has been corrected.

4. The multiple viewpoint imaging control device according to claim 1, wherein an image imaged at an imaging point prior to the imaging end point is displayed on the display screen with a predetermined degree of transparency.

5. The multiple viewpoint imaging control device according to claim 1, wherein a movement path of a viewpoint from the imaging start point to the imaging end point is a circular arc path centered on the subject, and the ranging point is disposed at the middle of the movement range.

6. The multiple viewpoint imaging control device according to claim 1, wherein the imaging points, including the at least two imaging points at the imaging start point and the imaging end point, are automatically set.

7. The multiple viewpoint imaging control device according to claim 1, further comprising:
a measurement section that measures a movement speed of a viewpoint from the imaging start point to the imaging end point; and
a stopping section that, if the movement speed of a viewpoint measured by the measurement section is greater than a predetermined value, judges that continuing automatic imaging is not possible and stops the imaging by the automatic imaging execution control section.

8. The multiple viewpoint imaging control device according to claim 1, wherein the imaging points, including the at least two imaging points at the imaging start point and the imaging end point, are manually set.

9. A multiple viewpoint imaging control method comprising:
displaying a moving image for determining an imaging image angle on a display screen;
provisionally imaging a specific subject that is included in the displayed moving image;
measuring at least a distance to the specific subject;
when imaging is to be performed from a plurality of imaging viewpoints, acquiring the imaging viewpoints and a convergence angle between the imaging viewpoints;
setting a number of viewpoints, including at least an imaging start point at which imaging is initially performed and an imaging end point at which imaging is finally performed;
computing position information including a movement amount of a viewpoint from the imaging start point at which imaging is initially performed to the imaging end point at which imaging is finally performed, on a basis of data of the convergence angle and data of the distance from a ranging point to the specific subject measured by the ranging section, such that a viewpoint at a position of the provisional imaging is at a middle of the movement amount;
on a basis of the computed position information, executing a notification prompting movement of a viewpoint from the ranging point to the imaging start point and a notification prompting a movement of a viewpoint from the imaging start point to the imaging end point;
automatically imaging the subject at an imaging viewpoint;
in accordance with the movement of a viewpoint, using the imaging start point as a reference image and judging whether or not the method is at a viewpoint that should be imaged, on a basis of a comparison between the reference image and an image imaged after the movement, the automatically imaging automatically imaging the subject at an imaging viewpoint when it is judged by the judging that the method is at the imaging viewpoint; and
storing image data imaged by the automatically imaging as element data.

10. The multiple viewpoint imaging control method according to claim 9, further comprising:
measuring a movement speed of a viewpoint from the imaging start point to the imaging end point; and
if the movement speed of a viewpoint measured by the measurement section is greater than a predetermined value, judging that continuing automatic imaging is not possible and stopping the imaging by the automatic imaging execution control section.

11. The multiple viewpoint imaging control method according to claim 9, wherein an updating is performed to set a viewpoint image that is automatically imaged by the automatically imaging at an imaging point subsequent to the imaging start point as a new reference image.

12. The multiple viewpoint imaging control method according to claim 11, wherein the judging judges, with respect to an image imaged after movement of a viewpoint, whether or not the imaging viewpoint is a viewpoint that should be imaged on a basis of an offset amount of a pre-specified background image when a positional offset of the specific subject between the image imaged after the movement and the reference image has been corrected.

13. A non-transitory, computer-readable medium storing a multiple viewpoint imaging control program causing a computer to execute a process comprising:
displaying a moving image for determining an imaging image angle on a display screen;
provisionally imaging a specific subject that is included in the displayed moving image;
measuring at least a distance to the specific subject;
when imaging is to be performed from a plurality of imaging viewpoints, acquiring the imaging viewpoints and a convergence angle between the imaging viewpoints;
setting a number of viewpoints, including at least an imaging start point at which imaging is initially performed and an imaging end point at which imaging is finally performed;
computing position information including a movement amount of a viewpoint from the imaging start point at which imaging is initially performed to the imaging end point at which imaging is finally performed, on a basis of data of the convergence angle and data of the distance from a ranging point to the specific subject measured by the ranging section, such that a viewpoint at a position of the provisional imaging is at a middle of the movement amount;
on a basis of the computed position information, executing a notification prompting movement of a viewpoint from the ranging point to the imaging start point and a notification prompting movement of a viewpoint from the imaging start point to the imaging end point;
automatically imaging the subject at an imaging viewpoint;
in accordance with the movement of a viewpoint, using the imaging start point as a reference image and judging whether or not the method is at a viewpoint that should be imaged, on a basis of a comparison between the reference image and an image imaged after movement, the automatically imaging automatically imaging the subject at an imaging viewpoint when it is judged by the judging that the method is at the imaging viewpoint; and
storing image data imaged by the automatically imaging as element data.

14. The non-transitory computer-readable medium according to claim 13, the process further comprising:
measuring a movement speed of a viewpoint from the imaging start point to the imaging end point; and if the movement speed of a viewpoint measured by the measurement section is greater than a predetermined value, judging that continuing automatic imaging is not possible and stopping the imaging by the automatic imaging execution control section.

15. The non-transitory computer-readable medium according to claim 13, wherein an updating is performed to set a viewpoint image that is automatically imaged by the automatically imaging at an imaging point subsequent to the imaging start point as a new reference image.

16. The non-transitory computer-readable medium according to claim 15, wherein the judging judges, with respect to an image imaged after the movement of a viewpoint, whether or not the imaging viewpoint is a viewpoint that should be imaged on a basis of an offset amount of a pre-specified background image when a positional offset of the specific subject between the image imaged after the movement and the reference image has been corrected.

* * * * *